United States Patent [19]

Suzuki et al.

[11] Patent Number: 5,059,339
[45] Date of Patent: Oct. 22, 1991

[54] DAMPING LIQUID FOR HYDRAULIC VIBRATION DAMPING MOUNT

[75] Inventors: Takamasa Suzuki, Konan; Katsumasa Takeuchi, Ichinomiya; Kazuya Ito, Yokkaichi, all of Japan

[73] Assignee: Toyoda Gosei Co., Ltd., Nishikasugai, Japan

[21] Appl. No.: 390,757

[22] Filed: Aug. 8, 1989

[30] Foreign Application Priority Data

Sep. 21, 1988 [JP] Japan .................. 63-236898

[51] Int. Cl.$^5$ .......................... C09K 5/00; C09K 3/00
[52] U.S. Cl. ........................................ 252/77; 252/75; 252/78.1; 252/392; 252/394; 252/67
[58] Field of Search ............. 252/75, 77, 78.1, 51.5 R, 252/392, 394, 67

[56] References Cited

U.S. PATENT DOCUMENTS

| | | | |
|---|---|---|---|
| 3,686,058 | 8/1987 | Schwartz et al. | 252/75 |
| 4,219,434 | 8/1980 | Ellis | 252/78.1 |
| 4,552,686 | 11/1985 | Morris-Sherwood et al. | 252/392 |
| 4,828,741 | 5/1989 | Meier et al. | 252/51.5 R |
| 4,830,770 | 5/1989 | Wirth et al. | 252/77 |

FOREIGN PATENT DOCUMENTS 47030900 11/1972 Japan .
62-010147 1/1987 Japan .

OTHER PUBLICATIONS

Hawley's Condensed Chemical Dictionary, 11th edition, 1987, p. 92.

Primary Examiner—Prince E. Willis
Assistant Examiner—J. Silbermann
Attorney, Agent, or Firm—Cushman, Darby & Cushman

[57] ABSTRACT

A damping liquid for a hydraulic vibration-damping mount is composed of glycol, water and 2 to 20 weight % of age resistor having ozone resistance. The damping liquid gradually diffuses and infiltrates into a rubber member defining a liquid chamber of the hydraulic vibration-damping mount thereby remarkably improving the ozone resistance thereof.

7 Claims, 2 Drawing Sheets

DAMPING LIQUID FOR HYDRAULIC VIBRATION DAMPING MOUNT

BACKGROUND OF THE INVENTION

1. Field of the Invention

The present invention relates to a composition of a damping liquid to be enclosed in a hydraulic vibration-damping mount.

2. Description of the Prior Art

A hydraulic vibration-damping mount is composed of a vibration-damping rubber body adapted for supporting a vibrating body, which is provided with a liquid chamber therewithin, and is used to damp vibrations effectively by the operation of a damping liquid enclosed in the liquid chamber. One example of the above-described hydraulic vibration-damping mount is shown in FIG. 1.

In FIG. 1, the hydraulically vibration-damping mount is provided with vessel-shaped thick-walled vibration damping rubber body 1 having a lower opening, and a deformable rubber film 2 for closing the lower opening of the rubber body 1 to define a closed chamber. The closed chamber is filled with a damping liquid. The closed chamber is divided into an upper main liquid chamber A and a lower auxiliary liquid chamber B by a partition plate 3 having an orifice 31 at its center. The upper main liquid chamber A is defined by a wall of the vibration damping rubber body 1 while the lower auxiliary liquid chamber B is defined by a wall of the rubber film 2. Ordinarily, a liquid including ethylene glycol as a main ingredient is used as the damping liquid.

The hydraulic vibration-damping mount having the above-described construction is secured to a base body such as a vehicle frame through a vessel-shaped bottom plate 5 connected to a cylindrical side plate 4 adapted for supporting the vibration-damping rubber body 1. A vibrating body such as an engine is mounted on and secured to an upper plate 6, which is joined to a top surface of the vibration-damping rubber body 1.

When vibrations of large amplitude with frequency lower than that of the vibrating body are input, the vibration-damping rubber body 1 deforms to generate a high pressure within the main liquid chamber A. This causes the damping liquid to flow from the main liquid chamber A to the auxiliary liquid chamber B through the orifice 31 thereby generating a large vibration-damping force.

The walls defining the liquid chambers A, B conventionally have been made of natural rubber or natural rubber-based material cmposed of natural rubber and synthetic rubber such as styrene-butadiene rubber (SBR) or the like. The natural rubber or natural rubber-based material is superior to the other rubber material in vibration characteristics and durability, however it has a defect of in that it has low ozone resistance, accordingly, the hydraulic vibration-damping mount, especially the thin-walled rubber film 2 is apt to deteriorate due to ozone.

To prevent the vibration-damping mount from deteriorating due to ozone, a large amount of an age resistor having ozone resistance conventionally has been added to the rubber material. To this end, more than 10 parts by weight age (antiozonant) resistor must be added to 100 parts by weight rubber. This amount of the age resistor is much larger than the amount ordinarily added, which is only 1 through several parts by weight to the 100 parts by weight of rubber. This very large amount of age resistor is problematic in that the age resistor blooms on a surface of the rubber material when the mount is formed, blocking vulcanizing adhesion of the rubber material to the metallic member supporting the wall of the liquid chamber, thereby reducing the adhesive strength.

SUMMARY OF THE INVENTION

It is an object of the present invention to improve the ozone resistance of a rubber member used in a hydraulic vibration-damping mount without blocking vulcanizing adhesion of the rubber member to a metallic member.

In order to attain the above object, according to the present invention, a liquid mainly composed of glycol, water and 2 to 20 weight % of age resistor having ozone resistance is utilized as a damping liquid adapted for filling a liquid chamber of the hydraulically vibration-damping mount.

The damping liquid according to the present invention gradually diffuses and infiltrates into the rubber member defining the liquid chamber of the vibration-damping mount, and remarkably improves the ozone resistance thereof. Therefore, it is unnecessary to add a large amount of age resistor to the rubber member, thereby providing a hydraulically vibration-damping mount which is free from blocking of the vulcanizing adhesion and lowering of the adhesive strength, and is excellent in durability and vibration characteristics.

DETAILED DESCRIPTION OF THE EMBODIMENTS

Figure 1:
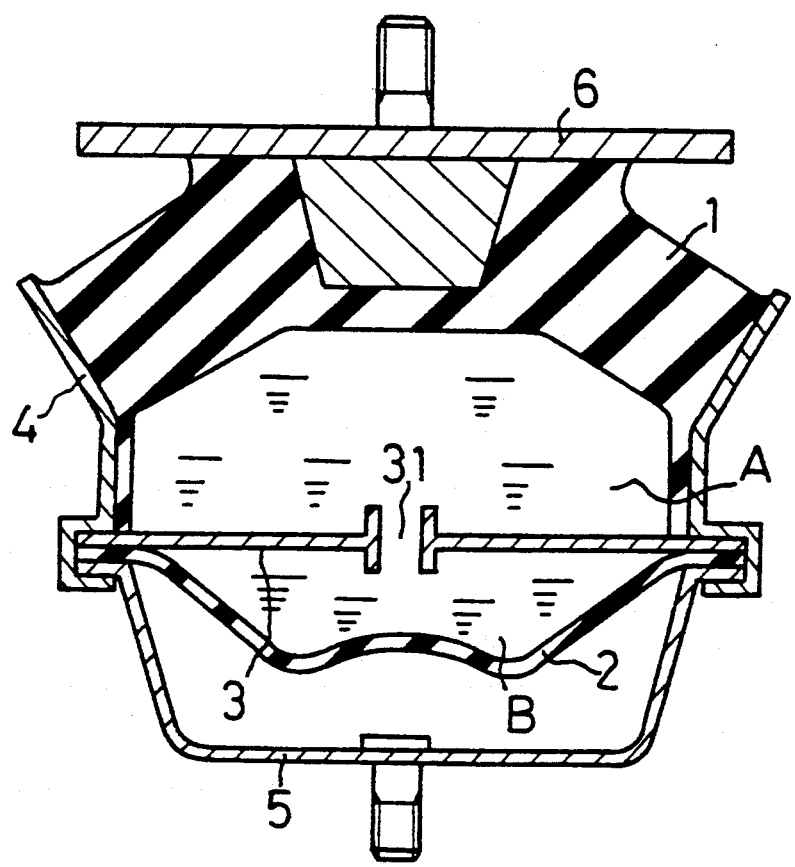
FIG. 1 is an overall cross sectional view of a hydraulic vibration-damping mount according to the present invention.

The damping liquid for filling a liquid chamber of a hydraulically vibration-damping mount is composed of a mixture of glycol and water, and includes an age resistor having ozone resistance dispersed within the mixture. Examples of glycols are ethylene glycol, ethylene glycol, propylene glycol or the like. One or more glycols may be used according to the present invention. The mixing ratio of glycols to water is not limited to a specific value, but may be voluntarily selected so as to have a desired viscosity. The preferable mixing ratio ranges from 98:2 to 70:30 by weight.

Examples of the age resistor having ozone resistance are an amine-based age resistor such as p-phenylenediamine derivative or the like, a thiourea-based age resistor such as tributylthiourea or the like, a amine ketone-based age resistor such as 6-etoxy-2,2,4-trimethyl-1,2-dihydroquinoline or the like, a dithiocarbamate-based age resistor such as nickel dibutyldithiocarbamate or the like, a and phenol resin-based age resistor. These age resistors preferably can be used to improve ozone resistance.

In order to prevent the precipitation of the age resistor having ozone resistance, it is desirable to select such an age resistor as having a specific gravity substantially the same as that of the above-described mixture of gycols and water. For example, for the mixture having the above-described mixture ratio an amine-based age resistor is selected, such as p-phenylenediamine derivative or the like, that is N-phenyl-N'-isopropyl-p-phenylenediamine, N-phenyl-N'-(1,3-dimethylbutyl)-p-phenylenediamine or the like. An amine based age resistor exhibits a specific gravity substantially the same as that of the above-described mixture of glycols and water, and accordingly can provide for a damping liquid of high stability. N-phenyl-N'-(1,3-dimetylbutyl)-p-phenylenediamine is particularly preferred since it has high solubility in glycols within the mixture, and, accordingly, can be restrained from separating from the mixture and from precipitating, and will further improve the stability of the damping liquid.

In this case, a plurality of the above-described age resistors may be used in combination.

The total amount of the age resistors may range from 2 to 20 weight %, and preferably from 3 to 10 weight %. When the age resistor is less than 2 weight %, the ozone resistance is not sufficiently improved, whereas when it exceeds 20 weight %, the fluidity of the damping liquid decreases, whereby desirable performance, including vibration characteristics cannot be maintained.

According to the present invention, various additives may be used along with the above-described age resistors so as to match with the desired characteristics. For example, the amine ketone-based age resistor serves to improve the heat resistance, whereas wax-based age resistor serves to improve the sun-crack resistance. In addition, corrosion resistant additive may be added for preventing the corrosion of metallic members.

By filling the liquid chamber of the hydraulically vibration damping mount with the damping liquid according to the present invention, the ozone resistant age resistor included within the damping liquid gradually diffuses and infiltrates into the rubber body defining the liquid chamber thereby improving the ozone resistance thereof.

Hereinafter, the present invention will be explained in detail in accordance with examples. The present invention is not limited to these examples without departing from the sprit and the scope of the invention.

EXAMPLES 1-4, COMPARATIVE EXAMPLES 1-2

Damping liquids were prepared by adding and dispersing amine age resistor in a mixture of 75 weight % of ethylene glycol, 15 weight % of dietylene glycol, and 10 weight % of water, having a specific gravity of 1.12. The content of the amine-based age resistor within the respective prepared damping liquids was 3, 5, 10, and 20 weight %, and these damping liquids which were prepared were used in Examples 1 through 4, respectively. For comparison, liquids having a content of the amine-based age resistor of 0 and 1 weight %, respectively, were also prepared, and used in respective comparative examples 1 and 2. NOCRAC 810NA[N-phenyl-N'-isopropyl-p-phenylenediamine, specific gravity: 1.15, made by Ouchi Shinko Chemical Industrial Co., Ltd., trade name] was used as the amine-based age resistor.

Figure 2:
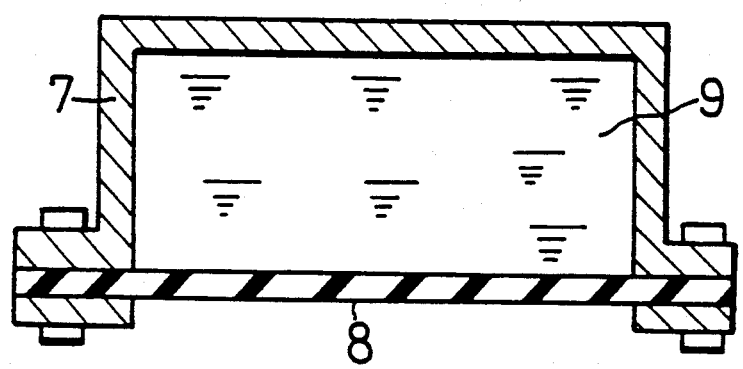
FIG. 2 is an overall cross sectional view of a device used in an embodiment according to the present invention.

Each of the above-described damping liquids was enclosed in a device of the type shown in FIG. 2, and the impact of the addition of the amine-based age resistor on the ozone resistance of the rubber material was examined. In FIG. 2, reference numeral 7 designates a vessel having a lower opening, 8 designates a sheet made of natural rubber-based material, which extends so as to cover the lower opening of the vessel 7, and 9 designates a damping liquid.

The sheet 8 was prepared by vulcanizing the rubber material having the composition shown in Table 1 at 160° C. for 10 minutes. The sheet 8 has a thickness of 2 mm.

TABLE 1

| Ingredient | Composition Ratio (part by weight) |
| --- | --- |
| Natural rubber | 100 |
| Zinc oxide | 5 |
| Stearic acid | 1 |
| Carbon black | 30 |
| Naphthene-based process oil | 5 |
| Wax-based age resistor | 2 |
| Amine ketone-based age resistor | 1 |
| Amine-based age resistor | 1 |
| Sulfur | 1.5 |
| Vulcanization accelerator | 1 |

An upper surface of the sheet 8 was brought into contact with the liquid 9, and this device was maintained at 70° C. for 70 hours. Thereafter, the sheet 8 was taken off the device, and dynamic ozone tests were conducted under the following conditions. The time taken until cracks are generated was measured. The test results are shown in Table 2.

Ozone concentration: 50 pphm
Temperature: 40° C.
Distortion: 1-30% Repetition (1 Hz).

As is apparent from Table 2, in Examples 1-4 where the content of amine-based age resistor is within the range of the present invention, the time taken until cracks are generated is much longer than that of comparative example 1 where no amine-based age resistor is used or that of Comparative example 2 where the content thereof is out of the range of the present invention. For instance, in Example 4, the time is 145 hours in contrast with 8 hours in Comparison example 1. These results show that the ozone resistance is remarkably improved in Example 4.

TABLE 2

|  | Comparative examples | | Examples | | | | | | | |
| --- | --- | --- | --- | --- | --- | --- | --- | --- | --- | --- |
|  | 1 | 2 | 1 | 2 | 3 | 4 | 5 | 6 | 7 | 8 |
| Content of amine-based age resistor (weight %) | 0 | 1 | 3 | 5 | 10 | 20 | 3 | 5 | 10 | 20 |
| Time taken until generation of cracks (hour) | 8 | 9 | 20 | 100 | 140 | 145 | 20 | 80 | 100 | 105 |

EXAMPLES 5-8

Damping liquids were prepared by adding an amine-based age resistor to a mixture of 90 weight % of dietylene glycol and 10 weight % of water, the specific gravity thereof being 1.12 so as to be dispersed therein.

NOCRAC 6C[N-phenyl-N'-(1,3-dimethylbutyl)-p-phenylenediamine, specific gravity:1.09, made by Ouchi Shinko Chemical Industrial Co., Ltd., trade name] was used as the amine-based age resistor. The content of the amine-based age resistor within the respective damping liquids was 3, 5, 10, and 20 weight %, and these damping liquids were prepared and used in Examples 5 through 8, respectively.

Tests similar to those of Examples 1-4 were conducted by using the obtained damping liquids. The test results are also shown in Table 2. As is apparent from Table 2, the damping liquids of Examples 5-8 also achieve good results such as the improvement in ozone resistance.

Next, the change of the physical properties of the rubber material after immersion in the damping liquids of Examples 1, 5 and Comparative example 1 was examined. Each of these liquids was introduced into the device shown in FIG. 2, and this device was maintained at 100° C. for 500 hours. Thereafter, the rates of change of the respective hardness(Hs), tensile strength($T_B$), elongation($E_B$), and volume(V), that is $\Delta Hs$, $\Delta T_B$, $\Delta E_B$, $\Delta V$ were measured. The results are shown in Table 3.

As is apparent from Table 3, in the damping liquid of Example 1, the rates of change of $\Delta T_B$, $\Delta V$ of the tensile strength and the volume are slightly increased as compared with those of the damping liquid of Comparative example 1, whereas the other rates of change are not so drastically changed. These results show that the physical properties of the rubber material are not influenced by the addition of the amine-based age resistor. In particular, the damping liquid of Example 5 exhibits experimental results substantially the same as those of Comparative example 1. These results clearly show that the influence of the addition of the amine-based age resistor on the physical properties of the rubber material can be decreased further in Example 5.

TABLE 3

| Change rate* | Comparison example 1 | Example 1 | Example 5 |
| --- | --- | --- | --- |
| $\Delta Hs$ [—] | −1 | −3 | −1 |
| $\Delta T_B$ (%) | −11 | −22 | −7 |
| $\Delta E_B$ (%) | −3 | −5 | +3 |
| $\Delta V$ (%) | 1.2 | 9.5 | 3.6 |

*ASTM D412-87 D471-79

What is claimed is:

1. A damping liquid for filling a liquid chamber defined by walls of a hydraulic vibration damping mount, the walls being composed of a vibration damping rubber, said damping liquid comprising a glycol, water and an antiozonant, the relative proportion of said glycol to said water ranging from 98:2 to 70:30 by weight, and said antiozonant comprising 2 to 20 weight % of said damping liquid.

2. A damping liquid according to claim 1, wherein said antiozonant includes at least one compound selected from the group consisting of amine-based antiozonant, thiourea-based antiozonant, amine ketone-based antiozonant, dithiocarbamate-based antiozonant, and phenol resin-based antiozonant.

3. A damping liquid according to claim 1, wherein said glycol includes at least one compound selected from the group consisting of ethylene glycol, diethylene glycol and propylene glycol.

4. A damping liquid according to claim 2, wherein said amine-based antiozonant is a derivative of p-phenylenediamine.

5. A damping liquid according to claim 1, wherein said antiozonant is from 3 to 10 weight % of said damping liquid.

6. A damping liquid according to claim 2, wherein said amine-based antiozonant includes at least one of N-phenyl-N'-isopropyl-p-phenylenediamine and N-phenyl-N'-(1, 3-dimethylbutyl)-p-phenylenediamine.

7. A damping liquid according to claim 1, wherein said antiozonant includes at least one compound selected from the group consisting of amine-based antiozonant and thiourea-based antiozonant.

* * * * *